United States Patent
Ben-Itzhak et al.

(10) Patent No.: US 11,645,587 B2
(45) Date of Patent: May 9, 2023

(54) QUANTIZING TRAINING DATA SETS USING ML MODEL METADATA

(71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMware, Inc., Palo Alto, CA (US)

( * ) Notice: Subject to any disclaimer, the term of this patent is extended or adjusted under 35 U.S.C. 154(b) by 378 days.

(21) Appl. No.: 16/924,035

(22) Filed: Jul. 8, 2020

(65) Prior Publication Data

US 2022/0012639 A1 Jan. 13, 2022

(51) Int. Cl.
- *G06N 20/20* (2019.01)
- *G06N 5/00* (2023.01)
- *G06N 5/01* (2023.01)

(52) U.S. Cl.
CPC ............... *G06N 20/20* (2019.01); *G06N 5/01* (2023.01)

(58) Field of Classification Search
CPC ................................ G06N 5/003; G06N 20/20
See application file for complete search history.

(56) References Cited

U.S. PATENT DOCUMENTS

| | | | | |
|---|---|---|---|---|
| 2018/0150783 | A1* | 5/2018 | Xu | G06Q 10/0633 |
| 2019/0340499 | A1* | 11/2019 | Burger | G06N 3/063 |
| 2020/0081865 | A1* | 3/2020 | Farrar | G06K 9/6218 |
| 2020/0092552 | A1* | 3/2020 | Coelho | H04N 19/147 |
| 2020/0218982 | A1* | 7/2020 | Annau | G06N 20/00 |
| 2020/0364552 | A1* | 11/2020 | Guo | G06N 3/0454 |
| 2021/0049507 | A1* | 2/2021 | Feng | G06N 20/00 |
| 2021/0256156 | A1* | 8/2021 | Enuka | G06F 16/337 |

\* cited by examiner

*Primary Examiner* — Abdullahi E Salad

(57) ABSTRACT

Techniques for quantizing training data sets using machine learning (ML) model metadata are provided. In one set of embodiments, a computer system can receive a training data set comprising a plurality of features and a plurality of data instances, where each data instance includes a feature value for each of the plurality of features. The computer system can further train a machine learning (ML) model using the training data set, where the training results in a trained version of the ML model, and can extract metadata from the trained version of the ML model pertaining to the plurality of features. The computer system can then quantize the plurality of data instances based on the extracted metadata, the quantizing resulting in a quantized version of the training data set.

21 Claims, 4 Drawing Sheets

QUANTIZING TRAINING DATA SETS USING ML MODEL METADATA

BACKGROUND

In machine learning (ML), mathematical models (i.e., ML models) are trained using training data sets in order to make predictions or decisions about unknown data. For example, in the case of supervised classification, an ML model referred to as an ML classifier is provided a training data set comprising labeled data instances—in other words, data instances that include one or more attributes (i.e., features) and a label indicating the correct class to which the data instance belongs—and is trained towards predicting the labeled class for each data instance. Upon being trained in this manner, the ML classifier can be deployed to classify new, unlabeled data instances.

Both the training complexity and resulting size of an ML model that is trained using a training data set are affected by the number of different values which each feature in the training data set can obtain. For example, if each feature in the training data set can have a value selected from 1000 possible values, the training complexity and size of the ML model will typically be higher than if each feature in the training data set can have a value selected from only 10 possible values. Thus, the ability to effectively quantize training data sets is of key interest, particularly for very large data sets.

Unfortunately, existing approaches to training data set quantization rely mainly on characteristics of the training data itself, which do not necessarily reflect the importance of certain features and feature values to the training process. Accordingly, these existing quantization approaches can result in noticeably degraded ML performance/accuracy or alternatively maintain ML performance/accuracy but offer a lower level of quantization.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for quantizing a training data set X based on metadata derived from an ML model S that has been trained using X As used herein, the act of "quantizing" training data set X refers to mapping data instance values for each feature in X from a large (often continuous) set of values to a smaller, discrete set of values.

For example, assume that training data set X includes two features F1 and F2 and that each data instance in X has a value for F1 selected from the set of real numbers between 0 and 10 and a value for F2 selected from the set of categories [C1, C2, C3, C4, C5, C6, C7]. In this example, quantizing training data set X may involve, e.g., converting the value for feature F1 in each data instance from a real number between 0 and 10 to an integer between 0 and 10 (thereby reducing the number of possible values for F1 from an infinite number to eleven) and converting the value for feature F2 in each data instance from a category in set [C1, C2, C3, C4, C5, C6, C7] to a category in set [C1, C4, C7] (thereby reducing the number of possible values for F2 from seven to three).

With the techniques described herein, the resulting quantized training data set (i.e., X') can be used train another ML model M in manner that is faster than training M using original training data set X and leads to a smaller model size. At the same time, because these techniques take into account metadata that is generated as part of training ML model S using X (rather than simply the feature values in X), quantized training data set X' can enable ML model M to achieve better ML performance/accuracy than quantized data sets created via existing quantization approaches.

2. Solution Architecture and High-Level Quantization Workflow

Figure 1:
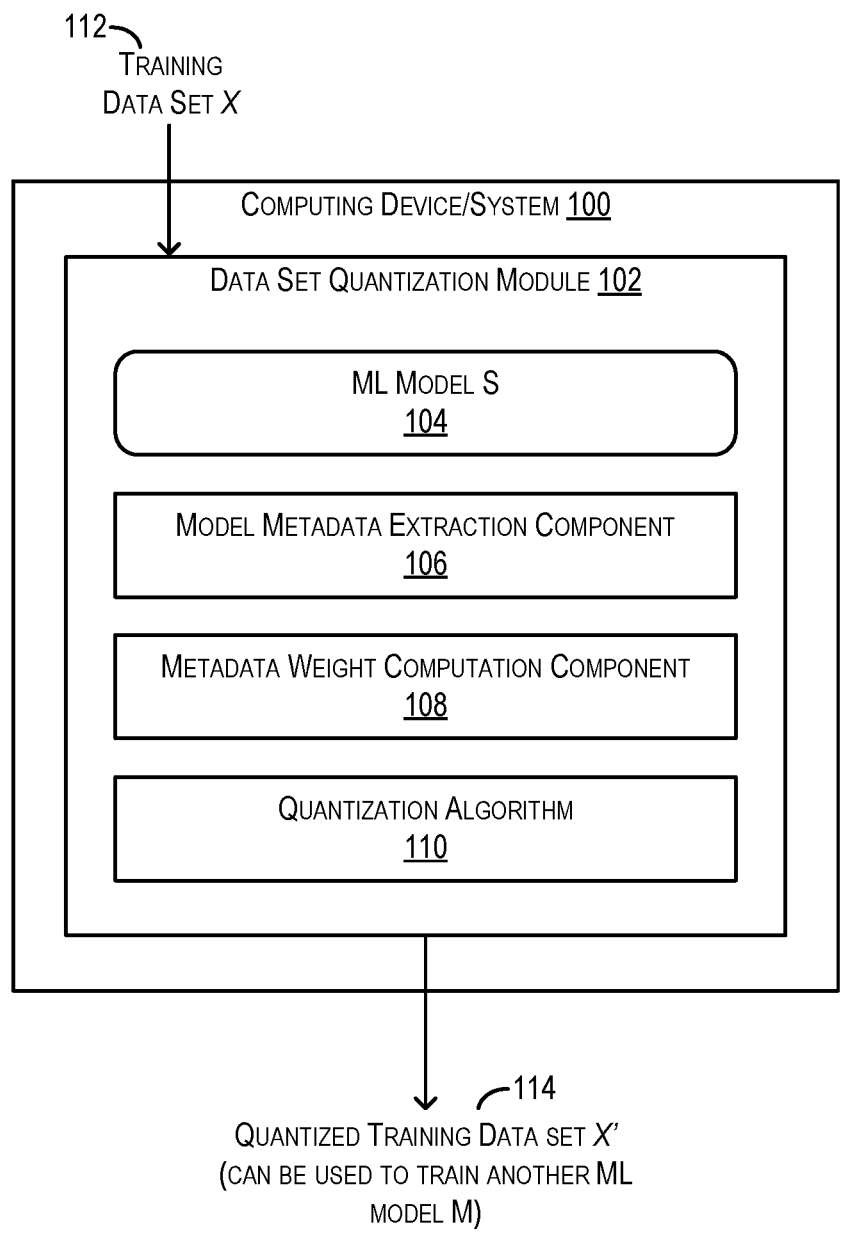
FIG. 1 depicts a computing device/system that implements the techniques of the present disclosure.

FIG. 1 depicts a computing device/system 100 that implements the quantization techniques of the present disclosure. As shown, computing device/system 100 comprises a data set quantization module 102 that includes an ML model S (reference numeral 104), a model metadata extraction component 106, a metadata weight computation component 108, and a quantization algorithm 110.

Data set quantization module 102, which may be implemented in software, hardware, or a combination thereof, is configured to receive, inter alia, a training data set X (reference numeral 112) and to generate a quantized version of X (i.e., quantized training data set X'; reference numeral 114). As mentioned previously, quantization refers to the act of mapping data instance values for each feature in X from a larger, potentially continuous set of values to a smaller, discrete set of values. Quantized training data set X' can be subsequently used to train another ML model M (which, in certain embodiments, may be more complex than ML model S of data set quantization module 102). For example, in a particular embodiment ML model S may be a simple (e.g., small) random forest classifier and ML model M may be a more complex (e.g., larger) random forest classifier.

Figure 2:
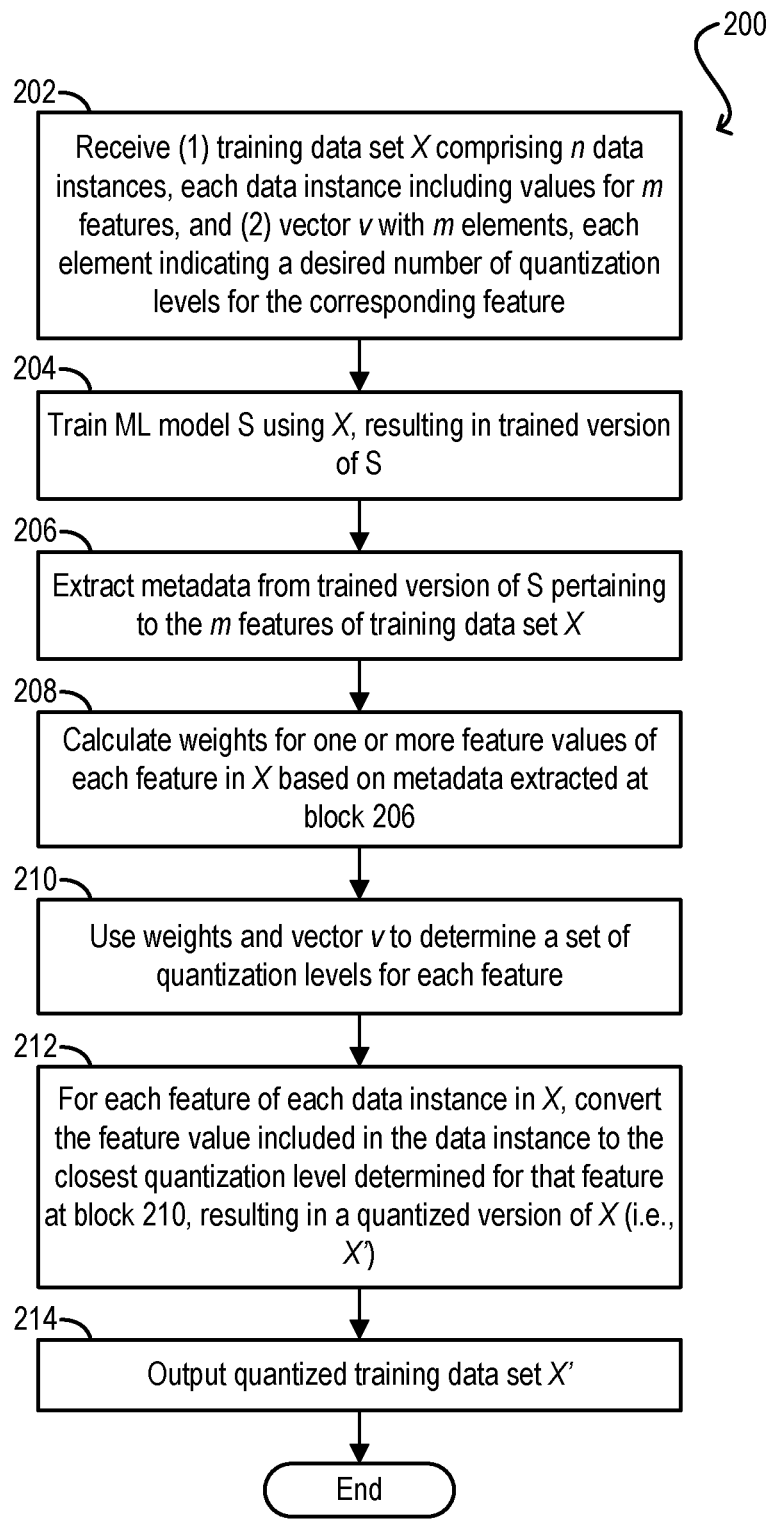
FIG. 2 depicts a high-level workflow for quantizing a training data set according to certain embodiments.

FIG. 2 depicts a high-level workflow 200 that may be executed by data set quantization module 102 of FIG. 1 and its constituent components 104-110 for quantizing training data set X and generating quantized training data set X' according to certain embodiments. As used herein, a "workflow" refers to a series of actions or steps that may be taken by one or more entities (in this case, module 102 and components 104-110). Starting with block 202, data set quantization module 102 can receive training data set X, where X comprises n data instances and where each data instance i for i=1 ... n includes a feature set xi with values for m features, as well as an associated vector v of m elements, where each vector element $v_j$ for j=1 ... m indicates a desired number of quantization levels (i.e., possible values) for feature j in X For example, if element $v_1$ of vector v equals 10, that means the desired number of possible values for the first feature of training data set X should be limited to 10.

At block 204, data set quantization module 102 can train ML model S using training data set X, resulting in a trained version of S. ML model S can be any type of ML model known in the art, such as a tree-based ensemble classifier/regressor, a neural network classifier/regressor, etc.

Data set quantization module 102 can then extract, via model metadata extraction component 106, metadata from the trained version of S pertaining to the m features of training data set X (block 206). For instance, in the case where ML model S is a random forest (RF) classifier/regressor, this step can involve identifying all of the decision tree nodes in the random forest where a split has occurred and, for each such node (which corresponds to a <feature, split value> tuple), extracting metadata generated by the RF training process with respect to that node/tuple. Examples of this metadata include the information gain achieved at the node/tuple, the tree level of the node, the resulting subset sizes, the number of different trees that used the node's split value, and feature importance.

At block 208, data set quantization module 102 can calculate, via metadata weight computation component 108, weights for one or more feature values of each feature in training data set X based on the metadata extracted at block 206. The general idea behind this step is to assign a higher weight to feature values that were more important to (or in other words, more heavily influenced) the training of ML model S, as indicated by the extracted metadata. For instance, in the example scenario above where ML model S is a random forest classifier/regressor, block 208 can involve calculating a weight function $f$ for each <feature, split value> tuple identified at block 206 that takes as input the metadata for the tuple and generates as output a tuple weight. The following is a sample, non-exhaustive list of potential formulations for weight function $f$ in this scenario:

$f$(tuple)=(sum of information gains)/(sum of tree levels)
$f$(tuple)=(number of different decision trees in which split value appeared)*(sum of information gains)
$f$(tuple)=(highest information gain)/(lowest tree level)

Note that more complex weight functions are also possible; such alternative function formulations may, e.g., allow for dependencies among different features or different split values or take into account state information generated from previous weight calculations.

At block 210, data set quantization module 102 can use the weights calculated at block 208 and vector v received at block 202 to determine, via quantization algorithm 110, an appropriate set of quantization levels for each feature in training data set X Generally speaking, this determination can limit the total number of quantization levels for each feature j in X to value $v_j$ in vector v and can bias the quantization levels towards the feature values (e.g., split values in the case of RF) with the highest weights. The specific quantization algorithm used at block 210 can vary depending on the implementation (e.g., Lloyd max, weighted k-means, mulaw, etc.).

Data set quantization module 102 can then, for each feature of each data instance in training data set X, convert the feature value included in the data instance to the closest quantization level determined for that feature at block 210 (block 212). For example, if the feature value is 34 and the surrounding quantization levels are 30 and 40, the feature value 34 can be converted to 30. The result of this process is a quantized version of training data set X (i.e., quantized training data set X').

Finally, at block 214, data set quantization module 102 can output quantized training data set X' (which can be subsequently used to train another ML model M) and workflow 200 can end.

With the high-level quantization approach shown in FIG. 2 and described above, a number of advantages are achieved. First, because the data instances of quantized training data set X' include a smaller range of possible values for each data set feature than original training data set X, the time needed to train another ML model (e.g., model M) using X' will be faster than using X, and will result in a smaller model (which in turn allows for faster prediction/inference).

Second, because the quantization process reduces the degree of entropy in the training data, quantized training data set X' can be more effectively compressed via conventional data compression algorithms. This facilitates the transferring of X' across networks and the storage of X' on computing devices/systems with limited storage capacity.

Third, because the foregoing approach quantizes the training data in a manner that takes into account the importance of features and feature values to the training process (per the metadata extracted from ML model S of module 102), the performance degradation caused by training an ML model using quantized data set X' will generally be lower than scenarios in which the ML model is trained using a data set quantized using existing quantization approaches (which only take into account feature values in the original training data).

It should be appreciated that FIGS. 1 and 2 are illustrative and not intended to limit embodiments of the present disclosure. For example, although data set quantization module 102 is shown in FIG. 1 as running on a single computing device/system 100, in some embodiments the various components of module 102 (i.e., ML model S, model metadata extraction component 106, metadata weight computation component 108, and quantization algorithm 110) may be distributed across multiple computing devices/systems for enhanced performance, reliability, fault tolerance, or other reasons.

Further, although workflow 200 of FIG. 2 assumes that data set quantization module 102 receives as input a vector v indicating the desired number of quantization levels for each feature in training data set X, in certain embodiments vector v may not be provided to module 102. In these embodiments, data set quantization module 102 can automatically determine the number of quantization levels to be applied per feature based on, e.g., the metadata extracted from the trained version of ML model S at block 206 and/or other information.

Yet further, although FIG. 1 depicts a particular arrangement of components within data set quantization module 102, other arrangements are possible (e.g., the functionality attributed to a particular component may be split into multiple components, components may be combined, etc.) and each component may include sub-components or implement functions that are not specifically described. One of ordinary skill in the art will recognize other variations, modifications, and alternatives.

3. Example Quantization Workflow Using Decision Tree Metadata

Figure 3A:
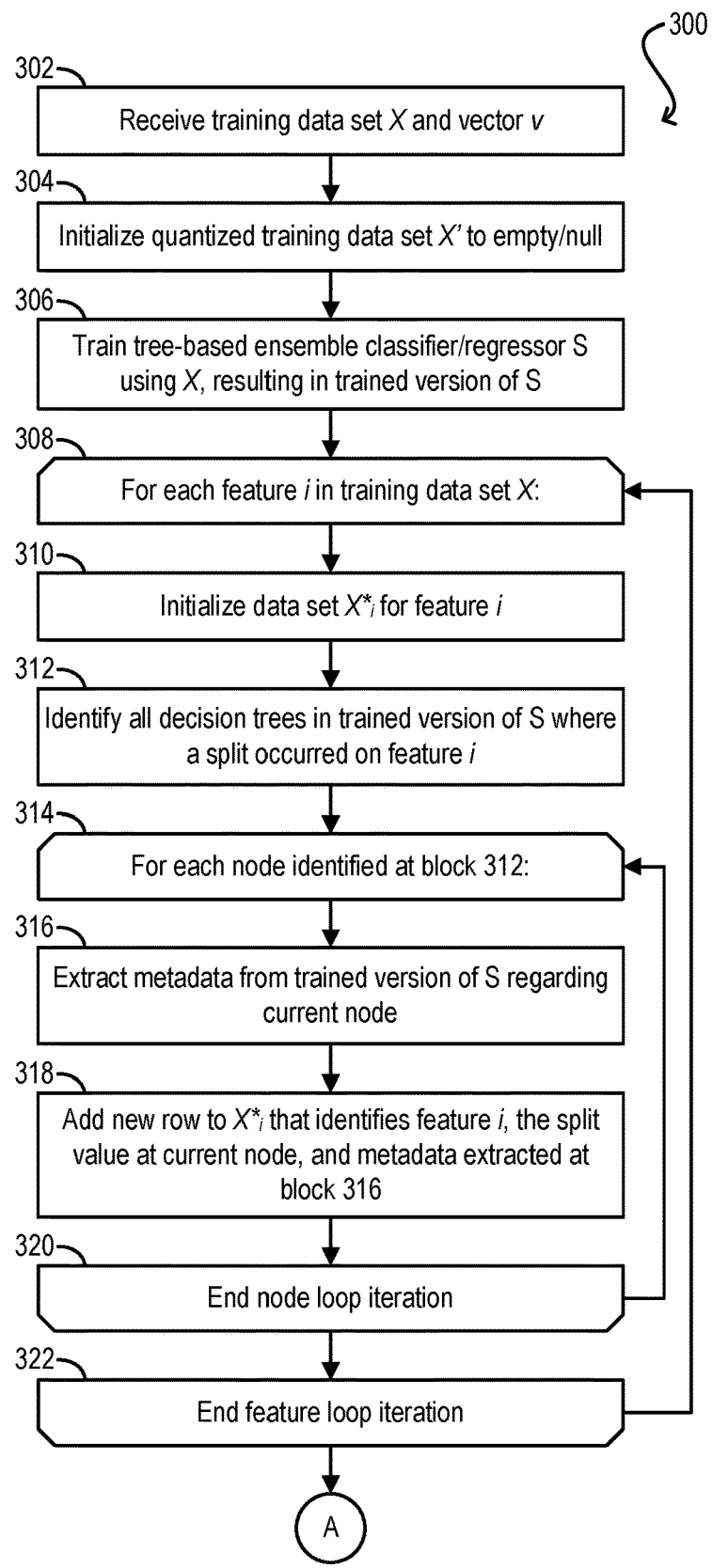
FIGS. 3A and 3B depict a workflow for quantizing a training data set using decision tree metadata according to certain embodiments.
Figure 3B:
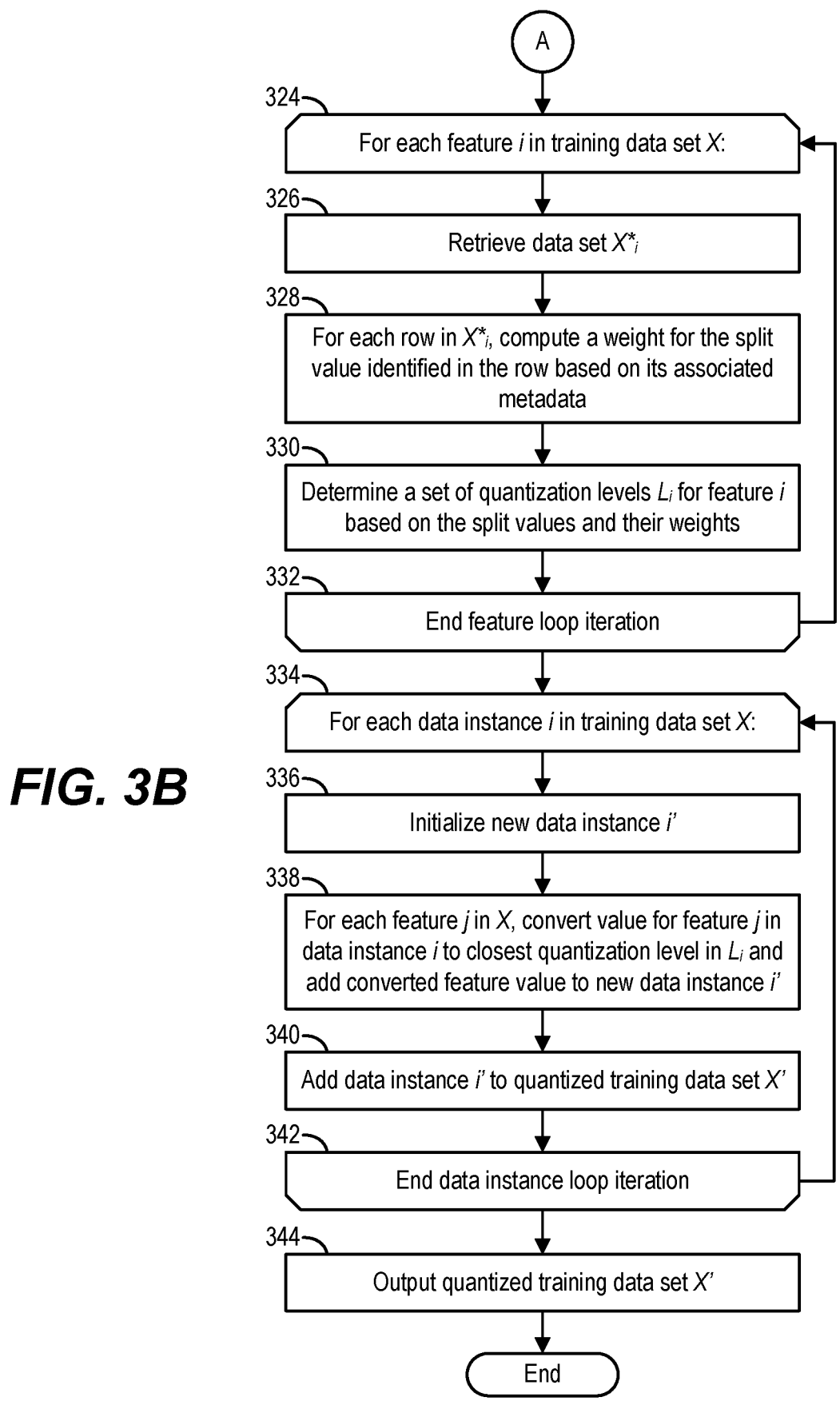

To further clarify the operation of data set quantization module 102 of FIG. 1, FIGS. 3A and 3B depict a workflow 300 that may be executed by module 102 for quantizing training data set X in the particular scenario where ML model S of module 102 is a tree-based ensemble classifier/regressor (i.e., a classifier/regressor composed of an ensemble of decision trees), such as a random forest or boosting method classifier/regressor. Workflow 300 is provided as an illustrative example and various modifications to this workflow, in accordance with high-level workflow 200 of FIG. 2, may be implemented in alternative embodiments.

Starting with blocks 302 and 304 of FIG. 3A, data set quantization module 102 can receive training data set X and vector v as noted with respect to block 202 of workflow 200 and can initialize quantized training data set X' to empty/null. Data set quantization module 102 can then train tree-based ensemble classifier/regressor S using training data set X, resulting in a trained version of S (block 306).

At block 308, data set quantization module 102 enter a loop for each feature i in training data set X, where i=1 . . . m. Within this loop, data set quantization module 102 can initialize a data set $X^*_i$ for feature i (block 310), identify all decision tree nodes in the trained version of S where a split occurred on feature i (block 312), and enter a loop for each node identified at block 312 (block 314).

Within the node loop of block 314, data set quantization module 102 can extract metadata from the trained version of S regarding the current node (i.e., <feature, split value> tuple) (block 316). As mentioned previously, this metadata can include, e.g., the information gain achieved at the node, the tree level of the node, etc.

Upon extracting the metadata, data set quantization module 102 can add a new row to data set $X^*_i$ that identifies feature i, the split value at the current node, and the metadata extracted at block 316 (block 318). Module 102 can then repeat the foregoing loop iterations for the remaining nodes of feature i (block 320) and the remaining features in training data set X (block 322), resulting in the generation of data sets $X^*_1 \ldots X^*_m$.

Turning now to block 324 of FIG. 3B, data set quantization module 102 can enter another loop for each feature i in training data set X, where i=1 . . . m. Within this loop, data set quantization module 102 can retrieve data set $X^*_i$ (block 326) and, for each row in $X^*_i$, compute a weight for the split value identified in the row, based on its associated metadata (block 328). In a particular embodiment, this weight computation can simply involve selecting a single representative metadata parameter for the feature/split value (e.g., information gain). In other embodiments, this weight computation can involve calculating a weight function that takes as input multiple metadata parameters, as discussed in section (2) above.

Upon computing the per-row/split value weights at block 328, data set quantization module 102 can determine, via quantization algorithm 110, a set of quantization levels $L_i$ for feature i based on the split values and their associated weights (block 330). The specific manner in which this determination is performed can vary depending on the chosen quantization algorithm. For example, in one set of embodiments, the weighted k-means algorithm can be employed. In these embodiments, block 330 can comprise plotting all of the split values for feature i on a 1-dimensional axis, finding the k weighted means in the plot (where k is set to $v_i$), and populating $L_i$ with the resulting k means. In another set of embodiments, a similar process can be carried out using Lloyd's algorithm.

Data set quantization module 102 can then reach the end of the current loop iteration (block 332) and repeat blocks 324-332 for the remaining features in training data set X.

At block 334, data set quantization module 102 can enter a final loop for each data instance i in training data set X, for i=1 . . . n. Within this loop, data set quantization module 102 can initialize a new data instance i' (block 336) and, for each feature j in data instance i (for j=1 . . . m), convert the value for feature j in i (i.e., $x_{ij}$) to the closest quantization level in $L_j$ and add the converted value to new data instance i' (block 338). Data set quantization module 102 can thereafter add data instance i' to quantized data set X' (block 340), reach the end of the current loop iteration (block 342), and return to block 334 in order to process the remaining data instances in X.

Finally, at block 344, data set quantization module 102 can output quantized training data set X' and workflow 300 can end.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving, by a computer system, a training data set comprising a plurality of features and a plurality of data instances, each data instance including a feature value for each of the plurality of features;
training, by the computer system, a first machine learning (ML) model using the training data set, the training resulting in a trained version of the first ML model;
extracting, by the computer system, metadata from the trained version of the first ML model, the metadata pertaining to the plurality of features; and
quantizing, by the computer system, the plurality of data instances based on the metadata, the quantizing resulting in a quantized version of the training data set, wherein the quantizing comprises, for each data instance in the plurality of data instances:
mapping each of the data instance's feature values from a first set of values to a second set of values, the second set being smaller than the first set.

2. The method of claim 1 wherein the quantized version of the training data set is used to train a second ML model different from the first ML model.

3. The method of claim 1 further comprising, prior to the quantizing:
computing, based on the metadata, weights for one or more feature values associated with each feature in the plurality of features, each weight indicating a degree of importance of the feature value to the training of the first ML model.

4. The method of claim 3 wherein the quantizing of the plurality of data instances takes into account the weights.

5. The method of claim 1 wherein the quantizing further comprises, for each feature in the plurality of features:
determining a set of quantization levels for the feature based on the metadata, the set of quantization levels indicating possible feature values for the feature that may be included in the quantized version of the training data set.

6. The method of claim 5 wherein the quantizing further comprises, for each data instance in the plurality of data instances:
converting the feature value included in the data instance for each feature to a closest quantization level in the feature's set of quantization levels.

7. A non-transitory computer readable storage medium having stored thereon program code executable by a computer system, the program code causing the computer system to execute a method comprising:
receiving a training data set comprising a plurality of features and a plurality of data instances, each data instance including a feature value for each of the plurality of features;
training a first machine learning (ML) model using the training data set, the training resulting in a trained version of the first ML model;
extracting metadata from the trained version of the first ML model, the metadata pertaining to the plurality of features; and
quantizing the plurality of data instances based on the metadata, the quantizing resulting in a quantized version of the training data set, wherein the quantizing comprises, for each data instance in the plurality of data instances:
mapping each of the data instance's feature values from a first set of values to a second set of values, the second set being smaller than the first set.

8. The non-transitory computer readable storage medium of claim 7 wherein the quantized version of the training data set is used to train a second ML model different from the first ML model.

9. The non-transitory computer readable storage medium of claim 7 wherein the method further comprises, prior to the quantizing:
computing, based on the metadata, weights for one or more feature values associated with each feature in the plurality of features, each weight indicating a degree of importance of the feature value to the training of the first ML model.

10. The non-transitory computer readable storage medium of claim 9 wherein the quantizing of the plurality of data instances takes into account the weights.

11. The non-transitory computer readable storage medium of claim 7 wherein the quantizing comprises, for each feature in the plurality of features:
determining a set of quantization levels for the feature based on the metadata, the set of quantization levels indicating possible feature values for the feature that may be included in the quantized version of the training data set.

12. The non-transitory computer readable storage medium of claim 11 wherein the quantizing further comprises, for each data instance in the plurality of data instances:
converting the feature value included in the data instance for each feature to a closest quantization level in the feature's set of quantization levels.

13. A computer system comprising:
a processor; and
a non-transitory computer readable medium having stored thereon program code that, when executed, causes the processor to:
receive a training data set comprising a plurality of features and a plurality of data instances, each data instance including a feature value for each of the plurality of features;
train a first machine learning (ML) model using the training data set, the training resulting in a trained version of the first ML model;
extract metadata from the trained version of the first ML model, the metadata pertaining to the plurality of features; and
quantize the plurality of data instances based on the metadata, the quantizing resulting in a quantized version of the training data set, wherein the program code that causes the processor to quantize the plurality of data instances comprises program code that causes the processor to, for each data instance in the plurality of data instances:

map each of the data instance's feature values from a first set of values to a second set of values, the second set being smaller than the first set.

14. The computer system of claim 13 wherein the quantized version of the training data set is used to train a second ML model different from the first ML model.

15. The computer system of claim 13 wherein the program code further causes the processor to, prior to the quantizing:
    compute, based on the metadata, weights for one or more feature values associated with each feature in the plurality of features, each weight indicating a degree of importance of the feature value to the training of the first ML model.

16. The computer system of claim 15 wherein the quantizing of the plurality of data instances takes into account the weights.

17. The computer system of claim 13 wherein the program code that causes the processor to quantize the plurality of data instances comprises program code that causes the processor to, for each feature in the plurality of features:
    determine a set of quantization levels for the feature based on the metadata, the set of quantization levels indicating possible feature values for the feature that may be included in the quantized version of the training data set.

18. The computer system of claim 17 wherein the program code that causes the processor to quantize the plurality of data instances further comprises program code that causes the processor to, for each data instance in the plurality of data instances:
    convert the feature value included in the data instance for each feature to a closest quantization level in the feature's set of quantization levels.

19. A method comprising:
    receiving, by a computer system, a training data set comprising a plurality of features and a plurality of data instances, each data instance including a feature value for each of the plurality of features;
    training, by the computer system, a first machine learning (ML) model using the training data set, the training resulting in a trained version of the first ML model;
    extracting, by the computer system, metadata from the trained version of the first ML model, the metadata pertaining to the plurality of features; and
    quantizing, by the computer system, the plurality of data instances based on the metadata, the quantizing resulting in a quantized version of the training data set, wherein the quantizing comprises, for each feature in the plurality of features:
        determining a set of quantization levels for the feature based on the metadata, the set of quantization levels indicating possible feature values for the feature that may be included in the quantized version of the training data set.

20. A non-transitory computer readable storage medium having stored thereon program code executable by a computer system, the program code causing the computer system to execute a method comprising:
    receiving a training data set comprising a plurality of features and a plurality of data instances, each data instance including a feature value for each of the plurality of features;
    training a first machine learning (ML) model using the training data set, the training resulting in a trained version of the first ML model;
    extracting metadata from the trained version of the first ML model, the metadata pertaining to the plurality of features; and
    quantizing the plurality of data instances based on the metadata, the quantizing resulting in a quantized version of the training data set, wherein the quantizing comprises, for each feature in the plurality of features:
        determining a set of quantization levels for the feature based on the metadata, the set of quantization levels indicating possible feature values for the feature that may be included in the quantized version of the training data set.

21. A computer system comprising:
    a processor; and
    a non-transitory computer readable medium having stored thereon program code that, when executed, causes the processor to:
        receive a training data set comprising a plurality of features and a plurality of data instances, each data instance including a feature value for each of the plurality of features;
        train a first machine learning (ML) model using the training data set, the training resulting in a trained version of the first ML model;
        extract metadata from the trained version of the first ML model, the metadata pertaining to the plurality of features; and
        quantize the plurality of data instances based on the metadata, the quantizing resulting in a quantized version of the training data set, wherein the program code that causes the processor to quantize the plurality of data instances comprises program code that causes the processor to, for each feature in the plurality of features:
            determine a set of quantization levels for the feature based on the metadata, the set of quantization levels indicating possible feature values for the feature that may be included in the quantized version of the training data set.

* * * * *